Patented July 21, 1942

2,290,674

UNITED STATES PATENT OFFICE 2,290,674

CONDENSATION PRODUCT OF INGREDIENTS COMPRISING AN ALIPHATIC ALDEHYDE AND MALEIC DIAMIDE

Gaetano F. D'Alelio, Pittsfield, Mass., assignor to General Electric Company, a corporation of New York No Drawing. Application February 14, 1940, Serial No. 318,956

18 Claims. (Cl. 260—42)

This invention relates to new condensation products and is a continuation-in-part of my copending applications Serial No. 169,465, filed October 16, 1937, now Patent No. 2,239,440 issued April 22, 1941, and Serial No. 289,435, filed August 10, 1939, both of which applications are assigned to the same assignee as the present invention.

In application Serial No. 169,465 I disclosed resinous compositions prepared by reacting an aliphatic aldehyde, specifically formaldehyde, with an organic compound having the general structure

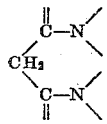

more particularly compounds such as malonic diamide, methylene cyanide, cyanoacetamide, etc., the claims in said application being directed specifically to reaction products produced from malonic diamide. During the reaction methylol and methylene derivatives are formed as intermediate products. For example, when malonic diamide is reacted with formaldehyde, an intermediate compound of the structure

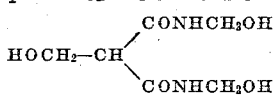

is obtained. When dehydrated, this intermediate compound yields

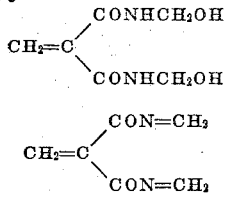

and

These latter compounds may be classed generally as methylol and methylene derivatives, respectively, of a

of unsaturated polycarboxylic amide. Likewise I showed that these methylol and methylene derivatives not only were resin-forming in themselves but that certain advantages accrued when they were interedensed with other bodies, for example phenols and aliphatic aldehydes. In practicing the invention described in application Serial No. 169,465, the methylol and methylene derivatives of the

type of unsaturated polycarboxylic acid amides were prepared in situ by dehydrating the carbonmethylol

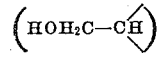

reaction product of, for example, formaldehyde and malonic diamide.

In my copending application Serial No. 289,435 I pointed out the advantages accruing by starting with a polyamide already containing a methylene, rather than a methylol, grouping attached to a carbon atom. More particularly, I disclosed and claimed in that application condensation products of an aliphatic aldehyde and an amide of an unsaturated polycarboxylic acid containing a

grouping and in which the carboxyl groups are attached to different carbon atoms. A typical example of such unsaturated amides, is itaconic diamide,

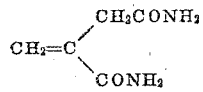

I also showed in that application that particularly valuable resinous compositions could be produced by interedensing an aliphatic aldehyde and a

type of unsaturated polyamide with at least one other aliphatic aldehyde-reactable organic compound capable of forming a methylol derivative as an intermediate during the resin formation, for example, urea, phenols, acetone, etc. I pointed out that when such unsaturated polyamides are interedensed with, for example, phenol and formaldehyde the introduction of the polyamide into the resin molecule yields light-colored resins and imparts light-stability thereto.

The present invention is based on my discovery that maleic diamide,

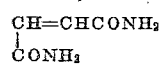

when condensed with an aliphatic aldehyde, e. g., formaldehyde, or when interedensed with an aliphatic aldehyde and a phenol or other aliphatic aldehyde-reactable organic compound capable of forming a methylol derivative as an intermediate during the resin formation, yields particularly valuable resinous compositions. More particularly, I have found that the incorporation of maleic diamide into a phenol-aliphatic aldehyde resin molecule greatly improves the color and light-stability of the phenolic resin in much the same way as malonic diamide and itaconic diamide cause such improvement.

From my research work in this field I am led to believe that the color of phenolic resins modified with a diamide of malonic acid, itaconic acid and maleic acid is influenced by the double bond connecting the alpha and beta carbon atoms. In the case of itaconic diamide and maleic diamide this bond initially is present in the amide. With malonic diamide this ethylenic carbon-to-carbon bond is produced in situ during resin formation.

The close relationship between malonic, itaconic and maleic diamides is shown by a consideration of their methylol and methylene derivatives, which are formed, for example, upon condensing the individual amide with formaldehyde and dehydrating the initial condensation product. Trimethylol malonic diamide has the structural formula

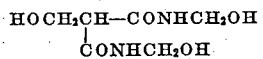

which, upon partial dehydration with the loss of one molecule of water, becomes dimethylol methylene malonic diamide, the formula for which is shown below in comparison with the formula for dimethylol itaconic diamide:

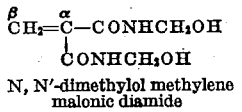

N, N'-dimethylol methylene malonic diamide

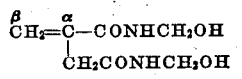

N, N'-dimethylol itaconic diamide, which also may be termed N, N'-dimethylol methylene succinic diamide The completely dehydrated products corresponding to the above dimethylol derivatives have the following structural formulas:

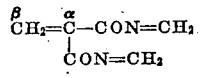

Trimethylene malonic diamide, which also may be termed N, N'-dimethylene methylene malonic diamide

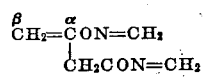

N, N'-dimethylene itaconic diamide, which also may be termed N, N'-dimethylene methylene succinic diamide The methylol and methylene derivatives of maleic diamide have the following structural formulas:

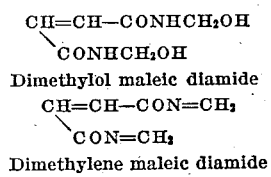

It will be noted from the foregoing formulas that dimethylol maleic diamide is an isomer of N,N'-dimethylol malonic diamide and N,N'-dimethylol itaconic diamide is a homologue of N,N'-dimethylol methylene malonic diamide. The same relationships hold for the corresponding methylene derivatives. That the unsaturation between the alpha and beta carbon atoms, and not the methylene groups attached to the nitrogen atoms, influences the color of the amide-modified phenolic resin is evidenced by the fact that compositions comprising resins made with maleic diamide, malonic diamide and itaconic diamide yield molded articles considerably lighter in color than obtained with resins produced from succinic diamide and citramide. If the N-methylene grouping were the important factor, then succinic diamide and citramide should give the same results as malonic diamide, itaconic diamide and maleic diamide. But, as shown by the comparative test results hereinafter given, succinic diamide and citramide, which can form only N-methylene groupings during the reaction with phenol and formaldehyde, yield molded articles of poor color.

I am aware that the broad suggestion has been made heretofore that resinous compositions may be obtained by condensing formaldehyde or its polymers with polyamides of polycarboxylic acids, more particularly those containing more than four carbon atoms, e. g., polyamides of adipic acid, suberic acid, phthalic acid, citric acid, etc. However, to the best of my knowledge and belief, resinous compositions heretofore have not been made by condensing maleic diamide and an aliphatic aldehyde. Likewise, to the best of my knowledge and belief it was not known prior to my invention that particularly useful, relatively inexpensive, light-colored, light-stable resins could be produced by intercondensing maleic diamide with a phenol and an aliphatic aldehyde, or by intercondensing a partial condensation product or methylolderivative of maleic diamide and an aliphatic aldehyde with a partial condensation product or methylol derivative of a phenol and an aliphatic aldehyde.

In carrying the present invention into effect the condensation between the reactants may be carried out under acid, alkaline or neutral conditions at normal or elevated temperatures. Any substance or catalyst which has an acid or an alkaline nature may be used to obtain the acid, alkaline or neutral condition, as for example, ammonia, sodium hydroxide, calcium hydroxide, methyl amine, diethyl amine, tri-isopropyl amine, ethanol amine, tri-isopropanol amine, etc.; mixtures of such alkaline substances; inorganic or organic acids such as hydrochloric, sulfuric, phosphoric, acetic, acrylic, crotonic, malonic, etc.; mixtures of such acids; acid salts such as sodium acid sulfate, monosodium phosphate, monosodium phthalate, etc.; basic salts such as ammonium carbonate, potassium carbonate, sodium acetate, etc.; or mixtures of such salts.

I may condense the components used in practicing this invention under various conditions. For example, all the components may be mixed together and the reaction caused to proceed under acid, alkaline or neutral conditions. Or, I may effect partial condensation between an aliphatic aldehyde and at least one methylol-forming organic compound, preferably a phenol, and then add maleic diamide and effect further condensation. Or, I may first partially condense maleic diamide with an aliphatic aldehyde under acid, alkaline or neutral conditions and then add at least one methylol-forming organic compound and effect further condensation. Also, I may separately partially condense a methylol-forming organic compound and maleic diamide with an aliphatic aldehyde and then mix the two products of partial condensation and effect further condensation therebetween. Both syrups may be initially condensed under acid, alkaline or neutral conditions.

A preferred method of producing the resinous intercondensation products of this invention comprises reacting maleic diamide, an aliphatic aldehyde, e. g., formaldehyde, and an aldehyde-reactable organic compound capable of forming a methylol derivative as an intermediate during the resin formation, e. g., phenol, urea, etc., the reaction being initiated at a pH above 7.0 and being completed at a pH below 7.0.

Still other ways may be employed in combining the components and in producing the unmodified or modified condensation products of this invention, as readily will be understood by those skilled in the art as the description of the invention proceeds. These condensation reactions may proceed under a wide variety of time, pressure and temperature conditions. The temperature of reaction may vary from room temperature to the reflux temperature of the reactants at reduced, atmospheric or superatmospheric pressures.

The products obtained as described above properly may be designated as intermediate condensation products which, alone or mixed with fillers, pigments, dyes, lubricants, etc., may be used, for example, as molding compositions. The modified or unmodified resinous masses may be converted, by means such as hereafter set forth, to the insoluble infusible state. Depending upon the particular reactants employed and the particular conditions of reaction, these intermediate condensation products vary from clear, colorless, syrupy, water-soluble liquids to viscous milky dispersions and gel-like masses of decreased solubility in ordinary solvents such as alcohol, glycol, glycerine, water, etc. The liquid intermediate condensation products may be concentrated or diluted further by the addition or removal of volatile solvents to form liquid coating compositions of adjusted viscosity and concentration. These liquid compositions may be used, for instance, as surface coating materials, in the production of paints, varnishes, lacquers, enamels etc., for general adhesive applications, such as anticreasing agents, in producing laminated articles, and for numerous other purposes. The liquid intermediate products may be dehydrated and used as casting resins. Also, these products may be dried and granulated to form clear, unfilled heat-convertible resins.

In order that those skilled in the art better may understand how the present invention may be carried into effect, the following examples are given by way of illustration. All parts are by weight.

Example 1

| | Parts |
|---|---|
| Maleic diamide | 203.5 |
| Aqueous solution of formaldehyde (approximately 37.1% HCHO) | 572.0 |
| Sodium hydroxide in 10 parts water | 4.0 |

The above components were mixed and heated under reflux for 30 minutes, yielding a clear resinous solution. When a small sample of this liquid resin was heated on a 132° C. hot plate, a solid thermoplastic (soluble, fusible) resin resulted. Heat-curable (thermosetting), light-colored resins of good curing characteristics were obtained with the aid of catalysts, for example citric acid, or by intercondensing into the partial condensation product of ingredients comprising maleic diamide and an aliphatic aldehyde, specifically formaldehyde, components that impart self-curing characteristics to the resinous mass, e. g., a halogenated amide, specifically chloracetamide, and an aldehyde-reactable nitrated urea, specifically nitrourea. Reactants capable of imparting self-curing characteristics to resinous complexes of maleic diamide and an aliphatic aldehyde are described more fully hereafter and in various copending applications identified later herein. Molding compositions and molded articles may be made from these thermoplastic and thermosetting resinous masses.

Example 2

| | Parts |
|---|---|
| Maleic diamide | 20.4 |
| Aqueous solution of formaldehyde (approximately 37.1% HCHO) | 57.2 |
| Hydrochloric acid in 10 parts water | 0.4 |

The above components were mixed and heated under reflux for 30 minutes, yielding a clear resinous solution. The dehydrated, soluble, fusible resin cured in 20 seconds to a hard, insoluble and infusible film when a small sample was heated on a 132° C. hot plate. The dehydrated resin has characteristics which in general are the same as the heat-curable resinous masses of Example I.

In the above examples approximately four mols of aliphatic aldehyde, specifically formaldehyde, were used for each mol of maleic diamide. However, various other mol ratios of reactants may be employed, for example from ¾ to 6 mols aliphatic aldehyde for each mol maleic diamide. Preferably, I use approximately 1½ to 4½ mols aliphatic aldehyde per mol maleic diamide.

The following examples relate particularly to the production of condensation products of an aliphatic aldehyde, specifically formaldehyde, maleic diamide and a methylol-forming organic compound, specifically phenol and urea. In preparing such condensation products the ratio of total maleic diamide and methylol-forming organic compound may be varied, for instance as described above with reference to the mol ratios of aliphatic aldehyde to maleic diamide alone. Mainly for economic reasons I prefer to use not exceeding substantially 0.6 mol maleic diamide for each mol of the methylol-forming organic compound.

Example 3

| | Parts |
|---|---|
| Urea | 83.7 |
| Aqueous solution of ammonia (28%) | 9.3 |
| Aqueous solution of formaldehyde (approximately 37.1% HCHO) | 248.0 |
| Maleic diamide | 18.0 |
| Sodium hydroxide in 4 parts water | 0.08 |

The above components were mixed and reacted under reflux for 35 minutes. The resulting liquid resinous mass was clear when hot and only slightly cloudy upon cooling to room temperature. When a small sample of the resin syrup was heated on a 150° C. hot plate a soft, soluble, fusible gel was obtained. Heat-convertible resins of light color and good curing characteristics were obtained with the aid of catalysts, e. g., sodium chloracetate, or by intercondensing into the resin molecule components that impart self-curing characteristics to the resinous mass, e. g., chloracetamide, nitrourea and aminoacetamide hydrochloride, additional examples being given later herein with particular reference to certain copending applications in which I appear as sole inventor or as a joint inventor with Joe B. Holmes.

The cured resins of this example are light in color, show excellent internal plasticity when the filled resins are molded under heat and pressure and are highly resistant toward discoloration under the influence of light or heat and light.

*Example 4*

|  | Parts |
|---|---|
| Phenol | 90.0 |
| Aqueous solution of formaldehyde (approximately 37.1% HCHO) | 195.0 |
| Potassium carbonate (in water solution) | 2.85 |
| Maleic diamide | 18.0 |
| Oxalic acid (in water solution) | 4.86 |

The phenol and formaldehyde solution were mixed and reacted in the presence of the potassium carbonate catalyst. The reaction mass was maintained at about 50° C. for 4 hours. The maleic diamide was added to this phenolformaldehyde partial condensation product and the reaction was continued under reflux at the boiling temperature of the mass (approximately 94°–98° C.) for one hour. The oxalic acid was added to the resulting resin syrup in order to neutralize the potassium carbonate. A molding compound was made by mixing the resin syrup with 90 parts alpha cellulose in flock form and 0.5 part zinc stearate. The wet compound was thoroughly mixed and dried at about 70° C. until it was soft in the oven but dry and hard at room temperature, which required about 9 hours' drying. The dried material was further advanced toward the insoluble, infusible state by sheeting on differential rolls, one cold roll and the other at about 100° C., for about 1½ minutes. Samples of the compound were molded under a pressure of about 2000 pounds per square inch at about 130°–140° C. for 5 minutes. The molded articles were well cured and showed good plastic flow during molding. The color of the molded pieces was light yellow approaching that of old ivory.

For purpose of comparing the color-inhibiting or stabilizing effect of different amides when chemically united into a phenolic resin molecule, resins and molding compositions were made as described above with reference to a phenol-maleic diamide-formaldehyde condensation product, but using, instead of 18 parts maleic diamide, the same amount of citramide, succinic diamide, itaconic diamide and malonic diamide. In the preparation of one resin, 10 parts citramide were used instead of 18 parts. Below are shown the drying, sheeting and curing times employed in carrying out these comparative tests and the color of the finished molded articles:

| Polyamide used in preparing the resin | Drying time | Sheeting time | Curing time | Color of molded article |
|---|---|---|---|---|
|  | Hours | Minutes | Minutes |  |
| Maleic diamide | 9 | 1½ | 5 | Light yellow approaching old ivory. |
| Itaconic diamide | 2½ | 5 | 3 | Light ivory. |
| Malonic diamide | 4½ | 5 | 3 | Do. |
| Citramide (18 parts) | 5½ | 1½ | 5 | Very yellow. |
| Citramide (10 parts) | 1 | 1½ | 3 | Slightly less yellow than product made with 18 parts citramide. |
| Succinic diamide | 2 | 1½ | 3 | Yellow. |

Resins produced with citramide and succinic diamide showed such a tendency toward yellowing during sheeting that the sheeting time was reduced from 5 minutes to 1½ minutes, yet the molded articles were quite yellow. Even when the citramide concentration was reduced 44 per cent, that is from 18 parts to 10 parts, the drying time reduced to 1 hour and the curing time under heat in the mold to 3 minutes, the molded piece was quite yellow. In marked contrast, when maleic diamide was used the molded articles approached old ivory in color, which color remained practically unchanged after the articles stood exposed to the air for several weeks. This color stability was not shown by the citramide and succinic diamide compositions, which darkened to a brownish yellow upon standing for the same length of time. The results of these tests show definitely that maleic diamide is not the equivalent of citramide and succinic diamide in producing modified, light-colored phenolic resins.

It will be understood, of course, by those skilled in the art that the present invention is not limited to the use of the specific components named in the above illustrative examples in addition to maleic diamide. Thus, instead of formaldehyde other compounds engendering formaldehyde may be employed, for example paraformaldehyde, hexamethylenetetramine, etc. Other aliphatic aldehydes also may be used, the particular aldehyde depending upon economic considerations and the particular properties desired in the end product. For instance, in certain cases I may use acetaldehyde, propionaldehyde, butyraldehyde, acrolein, methacrolein, crotonaldehyde, etc., mixtures thereof, or mixtures of formaldehyde or compounds engendering formaldehyde with such aliphatic aldehydes.

Likewise, methylol-forming organic compounds other than urea and phenol may be used. Illustrative of such compounds are: monohydric alcohols such as ethyl, propyl, isopropyl, butyl, amyl, etc., alcohols; polyhydric alcohols such as ethylene glycol, diethylene glycol, glycerine, pentaerythritol, trimethylol nitro methane, etc.; amides such as formamide, acetamide, stearamide, acrylic acid amides (acryloamides), benzamide, toluene, sulfonamide, etc., amines such as ethylene diamine, aniline, phenylene diamine, amino alcohols, etc.; and mixtures thereof. Such organic compounds contain at least one hydrogen atom which, when reacted with an aliphatic aldehyde, specifically formaldehyde, is replaced by the substituent grouping —CH₂OH when the reactant is formaldehyde.

In carrying the present invention into effect I may use not only urea itself as the methylol-forming organic compound, but also related substances such as thiourea; derivatives of urea such as methyl urea, acetyl urea, benzoyl urea, phenyl thiourea, asymmetrical diethyl urea, allyl urea, 2-chloroallyl urea, ethylidene urea, methylol urea, methylene urea, guanidine (iminourea), dicyandiamide (cyano-iminourea), guanyl urea, guanyl thiourea, biguanidine, aminoguanidine, creatine, guanoline, etc. The term "a urea" as used generally herein and in the appended claims is therefore intended to include within its meaning substances of the kind above mentioned. Other examples of methylol-forming organic compounds that may be used are aminotriazoles, creatinine and sulfohydantoin.

Likewise, substances other than phenol itself may comprise the methylol-forming organic compound. For instance, I may use other reactive phenolic bodies such as ortho, meta and para cresols, ortho, meta and para chlorphenol, meta nitrophenol, p,p'-dihydroxy diphenyl propane, catechol, resorcinol, the xylenols, meta ethyl phenol, para tertiary butyl phenol, para tertiary amyl phenol, the ortho, meta and para phenyl phenols, the ortho, meta and para benzyl phenols, phenyl phenol ethane, etc., or mixtures of such aldehyde-reactable phenolic bodies.

The new intercondensation products of this invention in which the phenol is an ortho- or para-substituted phenol containing three or more carbon atoms in the substituent grouping are soluble in oils, as for example drying and semi-drying oils, and in such form, with or without further heat treatment of the oily solution of the resinous condensation product, may be used in the production of coating compositions such as varnishes, enamels, lacquers, etc. Examples of substituted phenols yielding oil-soluble intercondensation products are the ortho- and para-substituted butyl phenols, amyl phenols, indene phenols, coumar phenols, phenyl phenols, 2-ethyl hexyl phenols, terpene phenols, symmetrical phenyl phenol alkanes, styryl phenols, the nuclearly alkylated styrene phenols, the nuclearly alkylated phenyl, phenol alkanes, the nuclearly phenylated phenyl, phenol alkanes, etc.; or, in general, an ortho- or a para-substituted phenol having two reactive positions in the aromatic nucleus and containing at least three carbon atoms in the substituent grouping. The term "a phenol" as used generally herein and in the appended claims therefore is intended to include within its meaning not only phenol ($C_6H_5OH$) itself but also homologues of phenol and aldehyde-reactable substituted phenols of the kind above mentioned by way of example.

The resinous compositions of this invention which are initially heat-non-convertible may be rendered heat-convertible by incorporating therein a suitable direct (active) curing catalyst, e. g., phthalic acid, hydrochloric acid, etc., or a latent curing catalyst, e. g., sodium chloroacetate, alpha or beta or alpha and beta halogenated amide of a secondary amine, for instance diethyl chloroacetamide. Reference is made to my copending application Serial No. 288,033, filed August 2, 1939, and assigned to the same assignee as the present invention, for illustrative examples of other halogenated amides of this class which may be used as latent curing catalysts in practicing the present invention. Also, I may intercondense into the initial condensation products other components which impart self-curing characteristics to the resinous mass and which properly may be described as curing reactants as distinguished from the active (direct) and latent curing catalysts. Such components may be, for example:

1. A halogenated amide selected from the class consisting of alpha halogenated amide, beta halogenated amide and alpha, beta halogenated amide, the amide grouping of the said amides being

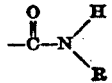

where R is hydrogen, or an alkyl, aryl, aralkyl, alkaryl, acyl, naphthyl, hydrocyclic or heterocyclic radical, or a nitro, halogeno, aceto, carbalkoxy or acetoxy derivative of the said radicals. An example of such a halogenated amide is chloroacetamide (monochloroacetamide). Reference is made to my copending application Serial No. 289,277, filed August 9, 1939, now Patent No. 2,285,418, issued June 9, 1942, for illustrative examples of other halogenated amides of this class which may be used.

2. An aldehyde-reactable halogenated acylated urea in which at least one halogen atom is attached to an alpha carbon atom, a beta carbon atom or alpha and beta carbon atoms, e. g., mono-chloroacetyl urea. Reference is made to my copending application Serial No. 289,273, filed August 9, 1939, now Patent No. 2,281,559, issued May 5, 1942, for illustrative examples of other halogenated acylated ureas of this class which may be used.

3. A halogenated nitrile of the class in which at least one halogen atom is attached to an alpha, beta or gamma carbon atom or to any two or all of such carbon atoms, e. g., chloroacetonitrile. Reference is made to my copending application Serial No. 289,274, filed August 9, 1939, for illustrative examples of other halogenated nitriles of this class which may be used.

4. A halogenated aldehyde in which at least one halogen atom is attached to an alpha carbon atom, a beta carbon atom, or alpha and beta carbon atoms, e. g. chloral hydrate. Reference is made to my copending application Serial No. 289,275, filed August 9, 1939, now Patent No. 2,277,480, issued March 24, 1942, for illustrative examples of other halogenated aldehydes of this class which may be used.

5. A halogenated ketone of the class of ketones in which at least one halogenated atom is attached to a carbon atom or atoms located alpha or beta or alpha and beta to the keto group, e. g., chloroacetone. Reference is made to my copending application Serial No. 289,276, filed August 9, 1939, for illustrative examples of other halogenated ketones of this class which may be used.

6. An aldehyde-reactable nitrated urea, for example nitrourea and sodium nitrourea. Reference is made to the copending application of Gaetano F. D'Alelio and Joe B. Holmes, Serial No. 289,281, filed August 9, 1939 now Patent No. 2,263,289, issued Nov. 18, 1941, for illustrative examples of other nitrated ureas of this class which may be used.

7. An aldehyde-reactable basic amine salt, e. g., methylene diamine monohydrochloride. Reference is made to my copending application Serial No. 289,278, filed August 9, 1939, for illustrative examples of other basic amine salts of this class which may be used.

8. An aldehyde-reactable aminoamide salt, e. g., aminoacetamide hydrochloride. Reference is made to my copending application Serial No. 289,279, filed August 9, 1939, for illustrative examples of other aminoamide salts of this class which may be used.

9. An aminoalcohol salt, e. g. diethanolamine hydrochloride. Reference is made to my copending application Serial No. 289,280, filed August 9, 1939, for illustrative examples of other aminoalcohol salts which may be used.

All of the above-identified copending applications are assigned to the same assignee as the present invention.

Although the reaction products of maleic diamide and an aliphatic aldehyde are valuable in themselves, they have even greater commercial utility when suitably modified. Thus, as aforementioned, intercondensation products of maleic diamide, an aliphatic aldehyde, e. g., formaldehyde, and a phenol are much lighter in color and are more light-stable than the ordinary phenol-aldehyde resins or phenolic resins internally modified with amides of saturated polycarboxylic acids, e. g., citric acid, succinic acid, etc. This is truly an unexpected result, since unmodified phenol-aldehyde resins have not been light-colored or, if initially so, have not been light-resistant.

Heretofore in applications involving solutions of aminoplasts, great difficulty has been experienced in obtaining syrups free from solid precipitates and of sufficient time stability. (The term "aminoplast" is a general term for synthetic resins derived from amino or amido compounds, a typical example being a urea-formaldehyde resin. Reference: Modern Plastics, vol. 17, No. 2, October, 1939, page 433, under the heading "Nomenclature" by Carleton Ellis. Published by Breskin Publishing Corporation, New York.) In order to obtain clear or uniform syrups it was necessary either to prevent precipitation by the addition of suitable emulsifying agents or solvents, or to remove the precipitate by mechanical means such as filtration. By practicing my invention these steps may be eliminated, thereby materially decreasing manufacturing costs, as the resinous syrup obtained by reacting maleic diamide, urea and formaldehyde is a clear, homogeneous, precipitate-free liquid mass. If the maleic diamide be omitted from the formula, a precipitate forms immediately on refluxing the urea and formaldehyde.

In producing urea-resin type of molding compounds of adequate plastic flow, it has been the general practice heretofore to incorporate a plasticizer, for example tricresyl phosphate, into the molding composition. Usually such plasticizers have been insoluble, or substantially so, in the resin syrup. Hence great care was required in obtaining a uniform distribution of the plasticizer through the resinous mass. In many cases a mutual solvent was necessary to effect sufficient homogeneity, thereby increasing production costs. Molding compositions made from urea-aliphatic aldehyde-maleic diamide resinous condensation products ordinarily require no added plasticizer, the advantages of which are obvious.

If desired, the fundamental resins of this invention may be modified by introducing other bodies before, during or after condensation between the primary components. These modifying substances may or may not have resinous characteristics and may be, for example, partially hydrolyzed wood product, lignin, proteins, protein-aldehyde condensation products, aniline-aldehyde condensation products, furfural condensation products, modified or unmodified, saturated or unsaturated polyhydric alcohol-polycarboxylic acid condensation products, sulfonamide, aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, etc.

Dyes, pigments and opacifiers (e. g., barium sulfate, zinc sulfide, titanium compounds such as the oxides, flaked aluminum, copper and the like) may be incorporated into the compositions of this invention to alter the visual appearance and the optical properties of the finished product. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Various fillers may be used to provide a wide variety of molding compounds. The choice of the filler depends upon the particular application for which the molded article is to be used. As fillers may be used, for instance, bleached or unbleached wood flour, alpha cellulose, sheets or cuttings of paper, cloth, canvas, etc., asbestos in powdered or long or short fiber length, powdered or flake mica, wood chips, short or long wood fibers, synthetic or natural continuous threaded fibers, glass fibers in continuous filament or fabric (woven or felted) form, etc.

In preparing molding compositions from the resinous bodies of this invention, the non-dehydrated or the partially dehydrated resins may be compounded with the above addition agents in accordance with procedures well-known to those skilled in the art. The molding compositions may be molded at elevated temperatures, e. g., between 100° and 170° C., preferably between 120° and 150° C., and at suitable pressures. The molding pressures generally range between about 1000 and about 4000 pounds per square inch, more particularly from about 2000 to 3000 pounds per square inch.

In addition to their use in molding compositions, the condensation products of this invention are especially suitable for use as fire retardants, water repellents and sizings when applied to wood or the like, or to fibrous materials such as silk, cotton, wool, synthetic organic fibers, etc., in continuous filament, thread, fabric or other form. It will be understood, of course, that optimum resistance to water, fire, solvents, etc., is obtained only when the applied coating or sizing is converted to the insoluble, infusible (cured) state. The cellulosic or other fibrous materials to be treated may be surface coated or both coated and impregnated by any suitable means, for example by spraying with, or immersing in, a solution of the treating agent and thereafter removing the solvent.

The modified and unmodified products of this invention have a wide variety of other uses, for instance in making buttons, clock cases, radio cabinets, dishes and other household utensils, decorative novelties and various other cast, molded and laminated articles of manufacture. They may be used in making laminated fibrous sheet materials wherein superposed layers of cloth, paper, etc., are firmly bonded together with the resin, in the manufacture of arc-extinguishing tubes, as bonding agents for mica flakes in producing laminated mica articles, in preparing wire or baking enamels, as impregnants for electrical coils and other electrical devices, and for other purposes.

What I claim as new and desire to secure by Letters Patent of the United States is:

1. A composition comprising a resinous product of reaction of ingredients comprising maleic diamide and an aliphatic aldehyde.

2. A composition as in claim 1 wherein the aliphatic aldehyde is formaldehyde.

3. A resinous composition comprising the product of reaction of a pluraltiy of reactants including maleic diamide, a urea and an aliphatic aldehyde.

4. A resinous composition comprising an alcohol-modified resinous condensation product of ingredients comprising maleic diamide, a urea and an aliphatic aldehyde.

5. A resinous composition comprising the product of reaction of a plurality of reactants including maleic diamide, urea and formaldehyde.

6. A composition comprising a resinous condensation product of ingredients comprising maleic diamide, a phenol and an aliphatic aldehyde.

7. A resinous composition comprising the product of reaction of a plurality of reactants including maleic diamide, a phenol and formaldehyde.

8. A composition comprising an alkaline-catalyzed resinous reaction product of ingredients comprising maleic diamide, phenol and formaldehyde.

9. An oil-soluble resinous composition comprising the product of reaction of ingredients comprising an aliphatic aldehyde, maleic diamide and a substituted phenol selected from the class consisting of ortho- and para-substituted phenols having two reactive positions in the aromatic nucleus and containing at least three carbon atoms in the substituent grouping.

10. A composition comprising the product of reaction of (1) a partial condensation product of ingredients comprising maleic diamide and formaldehyde and (2) a curing reactant.

11. A composition comprising the resinous product of reaction of a partial condensation product of ingredients comprising maleic diamide and formaldehyde with a partial condensation product of a phenol and formaldehyde.

12. A heat-convertible resinous composition comprising a soluble, fusible, resinous reaction product of ingredients comprising formaldehyde and maleic diamide.

13. A heat-curable resinous composition comprising the heat-convertible product of reaction of (1) a partial condensation product of ingredients comprising maleic diamide and formaldehyde, and (2) chloroacetamide.

14. A resinous composition comprising the product of reaction of (1) a partial condensation product of ingredients comprising maleic diamide, a urea and formaldehyde, and (2) chloroacetamide.

15. A product comprising the cured resinous composition of claim 12.

16. A product comprising the cured resinous composition of claim 13.

17. A heat-curable composition comprising the heat-convertible resinous product of reaction of (1) a partial condensation product of ingredients comprising maleic diamide and formaldehyde, and (2) chloroacetyl urea.

18. The method of producing a resinous composition which comprises effecting reaction between ingredients comprising maleic diamide and an aliphatic aldehyde, the reaction between the said components being initiated at a pH above 7.0 and being completed at a pH below 7.0.

GAETANO F. D'ALELIO.

CERTIFICATE OF CORRECTION.

Patent No. 2,290,674. July 21, 1942.

GAETANO F. D'ALELIO.

It is hereby certified that error appears in the printed specification of the above numbered patent requiring correction as follows: Page 7, first column, line 25, claim 11, after the word "of" insert --ingredients comprising--; and that the said Letters Patent should be read with this correction therein that the same may conform to the record of the case in the Patent Office.

Signed and sealed this 1st day of September, A. D. 1942.

(Seal)

Henry Van Arsdale,
Acting Commissioner of Patents.